US011561830B2

(12) United States Patent
Garla et al.

(10) Patent No.: US 11,561,830 B2
(45) Date of Patent: Jan. 24, 2023

(54) SYSTEM AND METHOD FOR LOW LATENCY NODE LOCAL SCHEDULING IN DISTRIBUTED RESOURCE MANAGEMENT

(71) Applicant: Huawei Technologies Co., Ltd., Shenzhen (CN)

(72) Inventors: Naganarasimha Ramesh Garla, Bengaluru (IN); Varun Saxena, Bengaluru (IN); Guilin Sun, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/658,699

(22) Filed: Oct. 21, 2019

(65) Prior Publication Data

US 2020/0050487 A1 Feb. 13, 2020

Related U.S. Application Data

(63) Continuation of application No. PCT/CN2018/083636, filed on Apr. 19, 2018.

(30) Foreign Application Priority Data

Apr. 19, 2017 (IN) ............................ 201741013938

(51) Int. Cl.
*G06F 9/50* (2006.01)
*G06F 9/38* (2018.01)
*G06F 9/48* (2006.01)

(52) U.S. Cl.
CPC .......... *G06F 9/5005* (2013.01); *G06F 9/3836* (2013.01); *G06F 9/48* (2013.01)

(58) Field of Classification Search
CPC .................................................... G06F 9/5005
See application file for complete search history.

(56) References Cited

U.S. PATENT DOCUMENTS 6,671,065 B1 * 12/2003 Salgado ................ G06F 9/5011 358/1.15
6,694,345 B1 2/2004 Brelsford et al.
(Continued)

FOREIGN PATENT DOCUMENTS

CN 103593242 A 2/2014
CN 103944769 A 7/2014
(Continued)

OTHER PUBLICATIONS

Machine Translation and Abstract of Chinese Publication No. CN103593242, Feb. 19, 2014, 20 pages.
(Continued)

*Primary Examiner* — Michael J Metzger
(74) *Attorney, Agent, or Firm* — Conley Rose, P.C.

(57) ABSTRACT

A system for allocation of resources and processing jobs within a distributed system includes a processor and a memory coupled to the processor. The memory includes at least one process and at least one resource allocator. The process is adapted for processing jobs within a distributed system which receives jobs to be processed. The resource allocator is communicably coupled with at least one process, and is adapted to generate one or more sub-processes within a limit of one or more resources allocated to the process for processing jobs.

20 Claims, 15 Drawing Sheets

(56) References Cited

U.S. PATENT DOCUMENTS

| | | | | |
|---|---|---|---|---|
| 6,988,139 | B1 * | 1/2006 | Jervis .................... | G06F 9/5038<br>709/224 |
| 8,195,739 | B2 | 6/2012 | Bernardin et al. | |
| 8,392,564 | B1 | 3/2013 | Czajkowski et al. | |
| 8,706,798 | B1 * | 4/2014 | Suchter ............... | H04L 43/0876<br>709/202 |
| 2005/0262506 | A1 | 11/2005 | Dawson et al. | |
| 2006/0190482 | A1 * | 8/2006 | Kishan ...................... | G06F 9/50 |
| 2010/0077403 | A1 * | 3/2010 | Yang ..................... | G06F 9/4881<br>718/104 |
| 2013/0227557 | A1 * | 8/2013 | Pechanec .................. | G06F 9/52<br>718/1 |
| 2013/0227582 | A1 | 8/2013 | Daly et al. | |
| 2014/0038654 | A1 | 2/2014 | Ahmadi | |
| 2015/0310032 | A1 * | 10/2015 | Kalal .................... | G06F 16/183<br>709/224 |
| 2016/0239323 | A1 * | 8/2016 | Tsirkin ................ | G06F 9/45558 |
| 2016/0321109 | A1 * | 11/2016 | He ........................ | G06F 9/5027 |
| 2018/0307518 | A1 * | 10/2018 | Imada ................. | G06F 9/45558 |

FOREIGN PATENT DOCUMENTS

| | | | |
|---|---|---|---|
| CN | 104780146 | A | 7/2015 |
| CN | 105357042 | A | 2/2016 |
| CN | 107066319 | A | 8/2017 |
| WO | 2014011084 | A1 | 1/2014 |

OTHER PUBLICATIONS

Machine Translation and Abstract of Chinese Publication No. CN103944769, Jul. 23, 2014, 10 pages.

Foreign Communication From A Counterpart Application, PCT Application No. PCT/CN2018/083636, English Translation of International Search Report dated Jul. 12, 2018, 5 pages.

Foreign Communication From A Counterpart Application, PCT Application No. PCT/CN2018/083636, English Translation of Written Opinion dated Jul. 12, 2018, 5 pages.

* cited by examiner

SYSTEM AND METHOD FOR LOW LATENCY NODE LOCAL SCHEDULING IN DISTRIBUTED RESOURCE MANAGEMENT

CROSS-REFERENCE TO RELATED APPLICATIONS

This application is a continuation of International Patent Application No. PCT/CN2018/083636, filed on Apr. 19, 2018, which claims priority to Indian Patent Application No. IN201741013938, filed on Apr. 19, 2017. The disclosures of the aforementioned applications are hereby incorporated by reference in their entireties.

TECHNICAL FIELD

The present disclosure described herein, in general, relates to data processing techniques and more particularly to a technique for low latency node local scheduling in distributed resource management.

BACKGROUND

A collection of autonomous machines connected by a network and unified by appropriate software and management policies is itself a computer system. This concept of a network-based computer system continues to become more and more significant in the computer industry. Network-based computers include more than a client-server computing and its emphasis on two party relationships. In network-based computing, a service (or resource) becomes a more general concept and no longer needs to be tied to a single machine, rather, it becomes a feature of the whole network-based computer. A network-based computer, or environment, can arise in a number of contexts such as in a heterogeneous collection of user workstations and server machines on a local area network, in a special purpose "clustered" machine consisting of individual processors connected by a high-speed network, or in a campus or enterprise or global network connecting several such environments together.

A distributed system is a model in which components located on networked computers communicate and coordinate their actions by passing messages. The components interact with each other in order to achieve a common goal. In a distributed system, applications running in parallel can utilize the combined resource capacity of multiple interconnected nodes by executing their tasks in parallel on different nodes. An important component in all of these environments is a resource management system, and a significant aspect of the resource management system is its job scheduling capability.

Conventionally, for assigning available resources to distributed applications on multiple nodes, a typical distributed resource scheduling (DRS) framework works as shown in FIG. 1. As shown in FIG. 1, the major components involved in assigning available resources to distributed applications on multiple nodes, are resource master (RM), application manager (AM), resource agent (RA), and containers. The container essentially means a process which is responsible for execution of a single unit of task within the scope of physical resources asked by the AM and later allocated by the RM. The RM keeps track of live RA's and available resources on the cluster, and, it allocates these resources as containers to applications based on resource requirements specified by AM. The AM handles application lifecycle and coordinates execution of all tasks (executed as containers) of the application. The AM asks for required resources, such as but not limited to Memory, central processing unit (CPU), etc., from RM to launch tasks and upon receipt of those resources, contacts RA to launch these tasks as containers. The RA runs on each node and sends periodic updates to RM about available resources on the node. The RA launches container processes on node, based on resources allocated by RM. The RA also carries out resource enforcement for containers and monitors their resource usage. Each container can have different resource (e.g. read-only memory (RAM), CPU) demands. An application can complete the execution by breaking its work into multiple tasks and running multiple containers in parallel.

A distributed execution flow for resource requests handled conventionally according to the typical DRS framework of the FIG. 1 is as shown in FIG. 2. As shown in FIG. 2, consider an application (AM) runs for a significantly long time and serves ad-hoc requests of clients. The AM in distributed processing systems can run forever unless brought down or it crashes. Following are the steps indicating how it will serve the ad-hoc client requests, 1. User issues an ad-hoc request to an AM running on DRS framework, 2. The AM evaluates the ad-hoc request and identifies the resources it requires on one or more nodes and requests resources from RM on these nodes, 3. The RA updates the nodes resources in heartbeat to the RM, 4. RM tries to schedule for the node's resources (if free) based on the scheduler queue hierarchy.

However, there is possibility of comparatively large delay in allocation of the requested resource by the AM based for client's ad-hoc request, because RM will either schedule asynchronously only after a specific time period or schedule when RA updates the node resources in Heartbeat to RM, RM schedules based on queue or resource pool hierarchy. If the queue or resource pool that the application is submitted to does not have sufficient free resource then there will be delay. Requested node might not have sufficient resource, and then application needs to wait till node gets free or Run in other location/node which will have other overhead (for instance, but not limited to network delay, slower disk, etc.) which can hamper performance. Thus, the existing DRS frameworks are not optimal for low latency node local allocation hence some of the existing applications follows an alternate approach adopted for processing ad-hoc requests in DRS framework as shown in FIG. 3. According to this alternate technique, application launches separate agents on each of the nodes of the cluster and these agents manage the execution of requests outside the DRS framework. RM still manages resources on the cluster and allocates it to AM when application asks for it. Dummy containers are launched equivalent to resources asked from RM.

As shown in FIG. 3, AM and an Application Agent (on each node) or Application specific daemons are started individually. Application Agents' register with the AM so that the AM knows which agents are up and running. Whenever a request is submitted to AM, the AM calculates how many resources are required for the request and where request fragments have to be executed that may be based on where data lies but may not be limited only to data location. Based on this, AM gets resources on the required nodes from RM (which belongs to DRS framework). After getting the resources, AM contacts Application Agents' running on the required nodes to execute request fragments. The AM also contacts RA to launch dummy containers so that resource scheduling framework can account for the resources it has granted. It is to be noted that these dummy containers do not do any work. Application Agent spawns request executors to process request fragments within the limits of resources received from DRS framework.

However, the alternate approach adopted for processing ad-hoc requests in DRS framework as shown in FIG. 3 has multiple drawbacks. One of the major drawbacks is that it does not utilize advanced features of DRS such as Adaptive scheduling because DRS frame work will not be able to detect resource usage of application agent and request executors. It is only aware of dummy container's resource usage which will be approximately zero, as it's a sleep job. The other major drawback is that the alternate approach is not easily scalable on cloud. Cloud has in-built auto-scaling support for DRS frameworks. As application processes run outside DRS framework in this approach, automatically scaling-up or scaling-down application processes (primarily Application Agents') is not possible whenever nodes are scaled up or down on Cloud. They have to be separately started or shutdown. Also, one of the drawbacks is associated with enforcement of resource isolation by application itself. Application Agent according to this approach needs to enforce resource isolation of Request Executors (RE) which should primarily be a responsibility of DRS framework as it is responsible for managing resources. Support for different operating systems and different types of resources (disk, network, etc.) needs to be taken care by application which is not its primary role.

Accordingly, there exists a need to provide a framework for low latency node local scheduling for a distributed processing system having distributed resource management, such as an ad-hoc request processing system, or other distributed systems for processing job requests. The framework allows for allocation of resources directly on the node without having to contact the central RM for further resource allocations, thereby achieving low latency. It is to be noted and will be understood by a person skilled in the art that the present document illustrates/describes the embodiment of the disclosure in relation to ad-hoc request in a non-limiting manner and the disclosure can be performed for low latency node local scheduling for other job requests also. Use of such other job requests instead of ad-hoc will still be considered to be in scope of the present disclosure.

The above-described deficiencies of existing job scheduling techniques within a distributed processing system are merely intended to provide an overview of some of the problems of conventional systems/mechanism/techniques, and are not intended to be exhaustive. Other problems with conventional systems/mechanism/techniques and corresponding benefits of the various non-limiting embodiments described herein may become further apparent upon review of the following description.

SUMMARY

This summary is provided to introduce concepts related to system and method for low latency node local scheduling in distributed resource management, and the same are further described below in the detailed description. This summary is not intended to identify essential features of the claimed subject matter nor is it intended for use in determining or limiting the scope of the claimed subject matter.

The object of the present disclosure is to provide a framework for low latency node local scheduling for a distributed processing system having distributed resource management, which allows for allocation of resources directly on the node without having to contact the central RM for further resource allocations, thereby achieving low latency. The framework also ensures resource isolation and resource re-sizing of the allocations made locally.

According to a first aspect, there is provided a system, for allocation of resources on a node, for processing at least one job request within a distributed system, the system comprising a processor, a memory operatively coupled to the processor for executing a plurality of modules present in the memory, the plurality of modules comprising an AM module operatively communicable to a RM module for allocation of resources, a local resource allocator module operatively located in a RA module for generating a master process module after the allocation of resources by the RM module, the AM module operatively communicable to the master process module after receiving the job request, the master process module operatively communicable to the local resource allocator module thereby the local resource allocator module generates one or more sub process modules for processing the job request based on the allocation of resources.

In a first possible implementation of the system according to the first aspect, the allocation of resources by the local resource allocator module comprises allocating resources for the master process module, allocating buffered resources for the one or more sub-process modules.

In a second possible implementation of the system according to the first aspect, the local resource allocator module is adapted for keeping track of the allocation of resources.

In a third possible implementation of the system according to the first aspect, the local resource allocator module is adapted for determining whether the allocation of resources for one or more sub-process modules is within a limitation of the resources preset by the master process module.

In a fourth possible implementation of the system according to the first aspect, the local resource allocator module is adapted for resizing the resources for one or more sub-process modules.

In a fifth possible implementation of the system according to the first aspect, the local resource allocator module is adapted for pausing the one or more sub-process modules.

In a sixth possible implementation of the system according to the first aspect, the master process module is adapted for coordinating with the one or more sub-process modules.

In a seventh possible implementation of the system according to the first aspect, the at least one job request comprises an ad-hoc job request.

According to the second aspect, there is provided a method, for allocation of resources on a node, for processing at least one job request within a distributed system, the method comprising communicating an AM module with a RM module for the allocation of resources, locating a local resource allocator module in a RA module for generating a master process module after the allocation of resources by the RM module, communicating the AM module with the master process module after receiving the job request, communicating the master process module with the local resource allocator module thereby generating the one or more sub process modules for processing the job request based on the allocation of resources by the local resource allocator module.

In a first possible implementation of the method according to the second aspect, the allocation of resources by the local resource allocator module comprises allocating resources for the master process module, allocating buffered resources for the one or more sub-process modules.

In a second possible implementation of the method according to the second aspect, keeping track of the allocation of resources being done by the local resource allocator module.

In a third possible implementation of the method according to the second aspect, determining, by the local resource allocator module, whether the allocation of resources for one or more sub-process modules is within a limitation of the resources preset by the master process module.

In a fourth possible implementation of the method according to the second aspect, resizing, by the local resource allocator module, the resources for one or more sub-process modules.

In a fifth possible implementation of the method according to the second aspect, pausing the one or more sub-process modules by the local resource allocator module.

In a sixth possible implementation of the method according to the second aspect, coordinating the master process module with the one or more sub-process modules.

In a seventh possible implementation of the method according to the second aspect, processing the at least one job request comprises processing an ad-hoc job request.

In order to solve the above motioned issue in current DRS framework the present disclosure provides a node local scheduling approach. Accordingly, the present disclosure provides a new local resource allocator module in RA adapted to run on each node, and also bring in the notion of master and sub-containers. The local resource allocator is adapted to allocate resources on the node on which it is running, within the scope of resource limits of master container which is a special container. The application may ask for resources for a master container which will include resources required for it and some buffer resources within which multiple sub-containers can be launched.

The various options and preferred embodiments referred to above in relation to the first implementation are also applicable in relation to the other implementations.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

Figure 1:
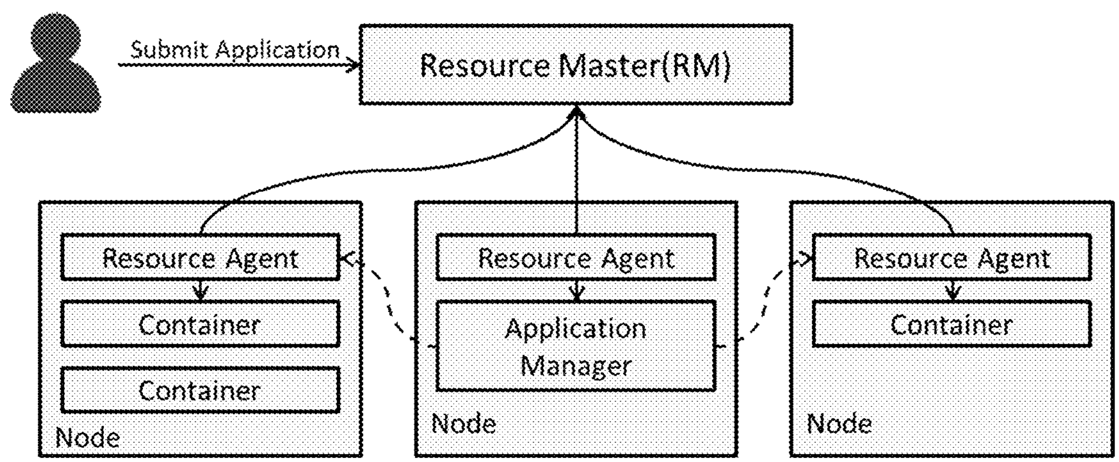
FIG. 1 illustrates a Distributed Resource Management/Scheduling (DRS).
Figure 2:
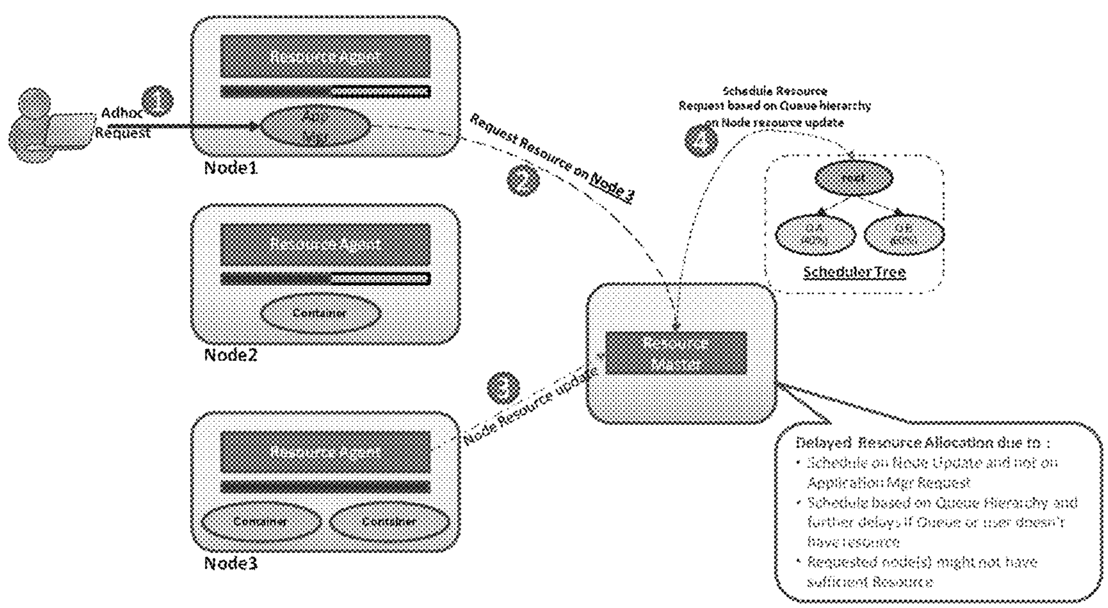
FIG. 2 illustrates a Distributed execution flow for ad-hoc resource requests in DRS framework.
Figure 3:
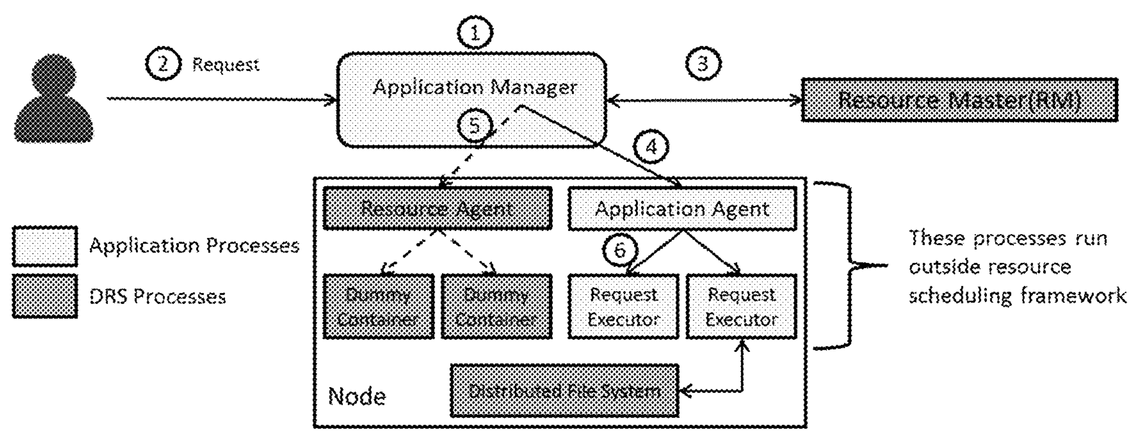
FIG. 3 illustrates an alternate approach adopted for processing ad-hoc requests in DRS framework.

It is to be understood that the attached drawings are for purposes of illustrating the concepts of the disclosure and may not be to scale.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The disclosure can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the disclosure may take, may be referred to as techniques. In general, the order of the steps of disclosed processes may be altered within the scope of the disclosure.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

In the following detailed description, numerous specific details are set forth in order to provide a thorough understanding of the disclosure. However, it will be understood by those skilled in the art that the present disclosure may be practiced without these specific details. In other instances, well-known methods, procedures, and components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Current DRS framework has a RM and one or more RA running on different nodes. In a distributed processing system, a task is further broken down to sub-tasks which are carried out parallel on these nodes. Applications may request for resources (CPU, memory, etc.) on specific nodes from RM depending on where the relevant data resides for execution of each sub-task. If sub-task can run on the same node as where the subset of data, the sub-tasks wants the process to reside on the same node due to which the execution will be faster as data will not have to be copied across nodes.

The RM then depending on current resource allocation on the cluster will assign resources to the application (based on what was asked by the application). Once the application gets the resources in the form of containers, it will launch the sub-task on the node given in the allocation. The container is nothing but a process which runs within the resource limits allocated to it.

Now in case for an ad-hoc query or ad-hoc request processing system i.e. where user can query anything at anytime, the current DRS frameworks approach does not work well. The reason being that, the application needs to ask for resources from RM depending on data asked in the query/request when the query is received. Now, the required resources may not be immediately available as there are other low-priority applications using it. Also resources cannot be allocated till next node report comes from RA. All this can introduce delay in resource being allocated, and hence can slow down query/request processing performance. Applications may potentially ask for resources on each node and keep it with itself but this will lead to poor cluster resource utilization as those resources need to be kept by the application even if it is not using it.

Hence, to solve the above motioned issue in current DRS framework the present disclosure provides a node local scheduling approach. Accordingly, the present disclosure provides a new local resource allocator module in RA adapted to run on each node, and also bring in the notion of master and sub-containers. The local resource allocator is adapted to allocate resources on the node on which it is running, within the scope of resource limits of master container which is a special container. The application may ask for resources for a master container which will include resources required for it and some buffer resources within which multiple sub-containers can be launched.

For instance, the application can initially ask for 8 gigabytes (GB) of resources for master container on a node. This 8 GB may include, say, 2 GB say of resources which master container requires running itself and 6 GB of buffer resources. Now based on amount of data being processed, whenever a job request comes, the master container may ask for sub-containers from local resource allocator. These sub-containers will execute sub-request(s) on that node. Local resource allocator will allocate resources within limits of buffer resources of master container (i.e. 6 GB). The sub-containers may be of any resource size till it fits within limits of master container. This allows ability to carry out fine-grained scheduling.

If requests are being executed, all or some of 6 GB of buffer resources will be utilized. The current DRS frameworks already allow for utilization of free/unused resources (even if they have been allocated) by launching low-priority tasks which can be preempted when the resources allocated are to be used. So if 6 GB buffer resources are unutilized, the buffer resources can still be used by other applications according to the present disclosure.

In a distributed processing system, such as an ad-hoc request processing system, typically the RM will run as AM and Application Agent as master containers. The RM on initialization will ask for resources for RA's (as master containers) on each node. As and when query comes, the RA on each node can ask for sub-containers to be launched from local resource allocator (inside RA) within resource limits set for request agent (running as master container). This ensures that there is no delay in getting resources on the node as scheduling is done locally on the node. Moreover, the present disclosure supports pausing of running sub-containers and also resource-resizing of sub-containers due to the communication of the master container with the local resource allocator, which is running in a RA.

Accordingly, an objective of the present disclosure is to provide a framework for low latency node local scheduling for distributed processing systems, such as an ad-hoc request processing system, which allows for allocation of resources directly on the node without having to contact the central RM for further resource allocations, thereby achieving low latency. The framework also ensures resource isolation and resource re-sizing of the allocations made locally.

To achieve the above objective the present disclosure provides the notion of master container and sub-containers. The master container will be a special container which coordinates launching of sub-containers within the limit of resources allocated to it. The present disclosure provides a mechanism for DRS framework to fulfill such requests from master container.

System and method for low latency node local scheduling in distributed resource management are disclosed.

While aspects are described for system and method for low latency node local scheduling in distributed resource management, the present disclosure may be implemented in any number of different computing systems, environments, and/or configurations, the embodiments are described in the context of the following exemplary systems, devices/nodes/apparatus, and methods.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

Figure 4:
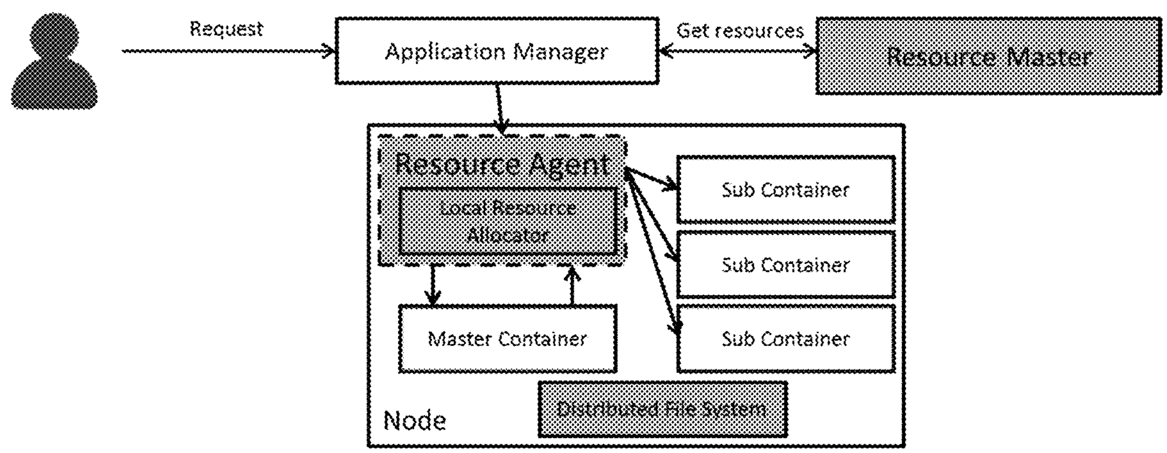
FIG. 4 illustrates system architecture of a framework for low latency node local scheduling for distributed processing systems, in accordance with an embodiment of the present disclosure.

Referring now to FIG. 4 system architecture of a framework for low latency node local scheduling for an ad-hoc request processing system is illustrated, in accordance with an embodiment of the present disclosure.

In one embodiment, FIG. 4 illustrates various new components introduced according to the present disclosure to achieve the objective of the present disclosure.

According to the present disclosure, in RA a new application program interface (API) is introduced/added which is capable of accepting a request for the launching of master containers with resource required for master containers along with the buffered/additional resource for sub-containers. The RA includes a local resource allocator. The local resource allocator is responsible for allocating resources locally to master container and the associated sub-containers within the available resource limits in the node. A master container is a special container which plays the role of coordinating the sub-container requests for the application on a specific node. The master container is adapted to enable launching of multiple sub-containers. The sub-containers are launched by local resource allocator within the limit of resources set aside for master container.

According to the present disclosure, an API may be introduced for master container to request resource resizing/pausing of sub-containers.

Figure 5:
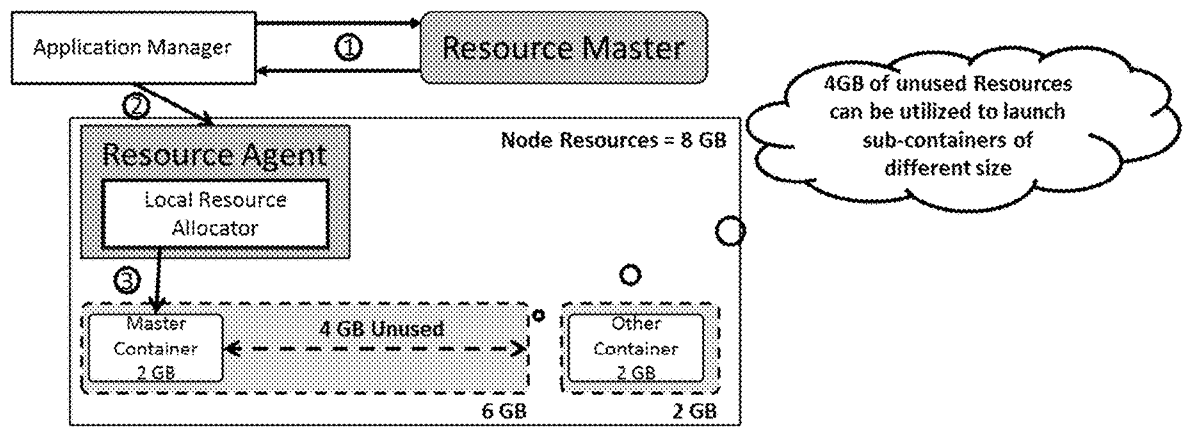
FIG. 5 illustrates a working of the framework for low latency node local scheduling for distributed processing systems, in accordance with an embodiment of the present disclosure.

Referring now to FIG. 5 a working of the framework for low latency node local scheduling for an ad-hoc request processing system is illustrated in accordance with an embodiment of the present disclosure.

As shown in FIG. 5.

At step 1, AM asks for resources for master container from RM. The resources asked for will include buffer resources required to launch a sub-container. In one example, as shown in FIG. 5, the AM asks for 6 GB of resources for master container (and its sub-containers) from RM.

At step 2, AM then contacts RA to launch a master container specifying the resources required for master container itself and resources set aside for launching sub-containers. In one example, as shown in FIG. 5, AM contacts RA to launch a master container with 2 GB of resources for master container and further 4 GB of buffer resources for sub-containers. This 4 GB can be used to launch sub-containers of various sizes.

At step 3, the local resource allocator keeps track of all the resources set aside for master container (including buffer resources) and launches master container.

Figure 6:
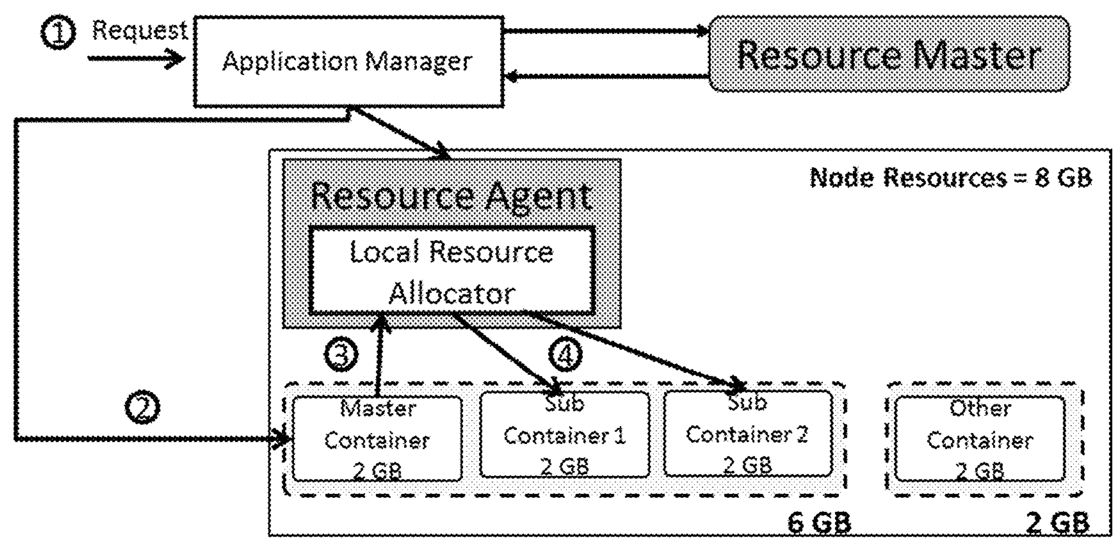
FIG. 6 illustrates a request processing according to the framework for low latency node local scheduling for distributed processing systems, in accordance with an embodiment of the present disclosure.

Referring now to FIG. 6 a request processing according to the framework for low latency node local scheduling for an ad-hoc request processing system is illustrated in accordance with an embodiment of the present disclosure. As shown in FIG. 6.

At step 1, ad-hoc request arrives at the AM.

At step 2, AM informs master container to launch sub-containers.

At step 3, the master container contacts local resource allocator to launch the required sub containers. In one example, as shown in FIG. 6, master container may request local resource allocator to launch 2 sub containers of 2 GB each.

At step 4, the local resource allocator checks if sub-containers to be launched are within master container limits and if yes, launches the sub-containers. Sub containers may be of any size within the resource limits of master container which helps in fine grained resource allocation. In one example, as shown in FIG. 6, as master container is allocated 6 GB of resources and requires only 2 GB for running itself, the present disclosure is adapted to launch sub-containers up-to 4 GB of resources within this master container.

Figure 7:
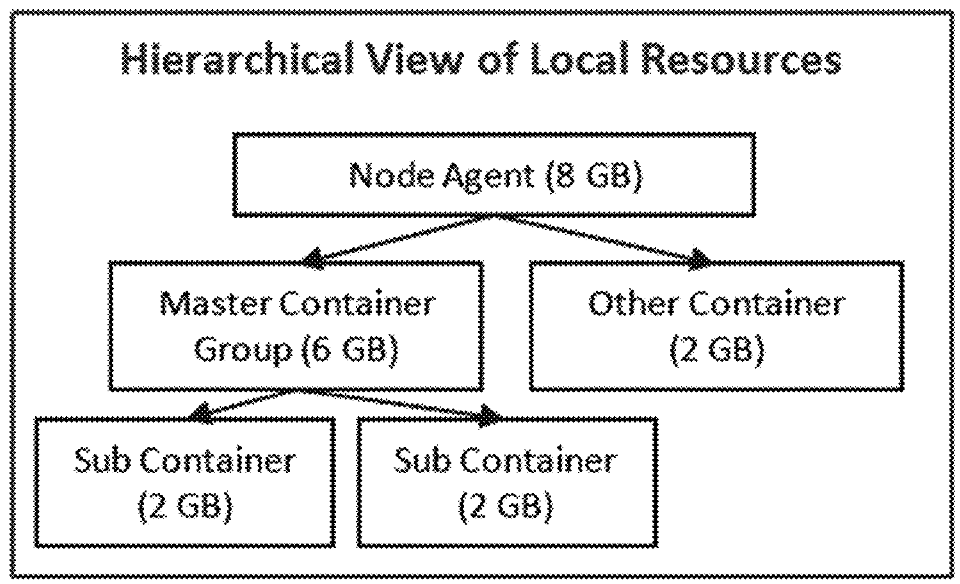
FIG. 7 illustrates a Hierarchical view of local resources allocated in the Node, in accordance with an embodiment of the present disclosure.
Figure 8:
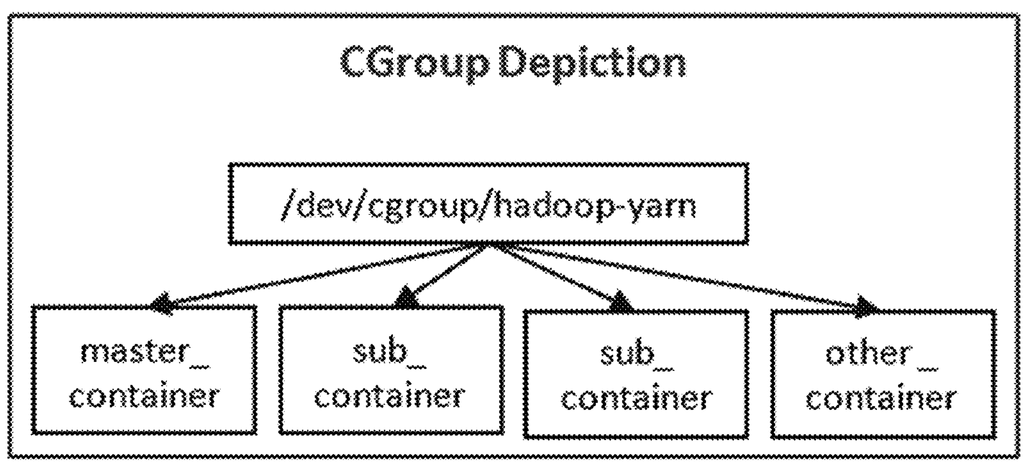
FIG. 8 illustrates a group mapping of local resources in the local resource allocators, in accordance with an embodiment of the present disclosure.

Referring to the example as shown in FIG. 6, i.e., if 2 sub-containers of 2 GB each are launched within master container limits of 6 GB, the hierarchy of containers (master container and sub containers) may look under in local resource allocator as shown in FIG. 7. The FIG. 7 illustrates a hierarchical view of resources allocated in the node, in accordance with an embodiment of the present disclosure. The hierarchical group of local resources may further be mapped to cgroups which ensures resource isolation between different containers. One way cgroup mapping may be as shown in FIG. 8. The FIG. 8 illustrates the resource isolation which can be achieved through cgroups for the resources allocated in the Node, in accordance with an embodiment of the present disclosure.

In one implementation, the local resource allocator optionally support following functionalities to prioritize the tasks in sub containers resources re-size, and pausing of sub-container.

Figure 9:
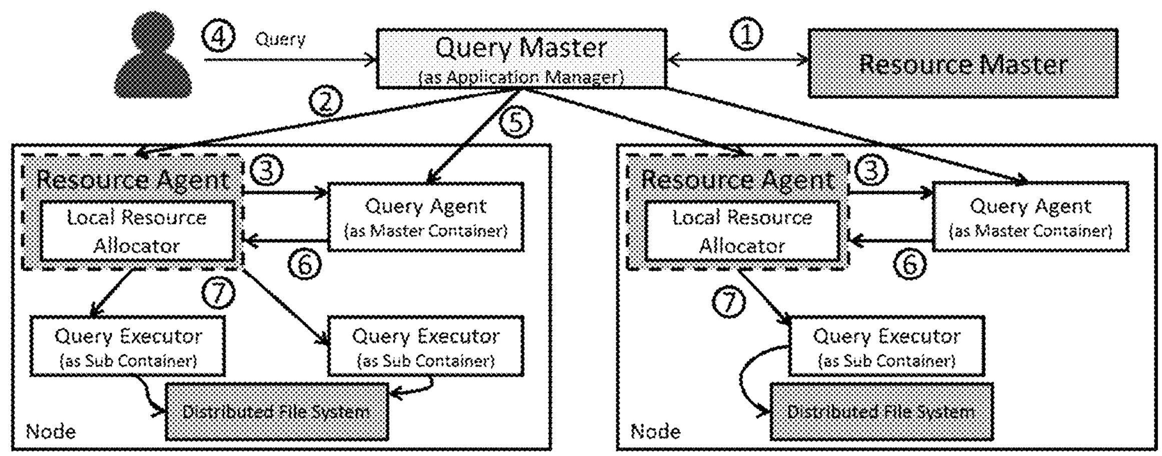
FIG. 9 illustrates an example 1 showing the framework for low latency node local scheduling adapted for use in a Massively Parallel Processing DataBase (MPPDB) ad-hoc Query processing system scenario, in accordance with an embodiment of the present disclosure.

Referring now to FIG. 9 an example 1 showing the framework for low latency node local scheduling adapted for use in a MPPDB query processing system scenario is illustrated in accordance with an embodiment of the present disclosure. Ad-hoc request processing systems such as MPPDB systems may utilize the present disclosure to run query agents' running on each node as master container and launching query executors' as sub-containers' of various sizes as per ad-hoc query requests. As shown in FIG. 9.

At step 1, query master may act as an AM and ask for resources from RM for launching query agent processes which run as master containers'. Resources asked may be equivalent to resources required for query agent plus a minimum number of resources required running sub-containers. Application may decide how much resources it wants to keep for sub containers.

At step 2, once required resources are received, query master contacts corresponding RA for the specified node to launch query agent as a master container.

At step 3, RA then launches query agent on the node as master container.

At step 4, query arrives at query master which may parse the query and create a query plan.

At step 5, based on query plan, query master contacts the query agents' (running as master containers') on the required nodes to execute query fragments in parallel.

At step 6, based on the resources required to execute query fragments in parallel, query agent (master container) will contact RA to launch query executors as sub containers of the query agent.

At step 7, local resource allocator within RA checks if the resources requested by query agent are within the resource limits and then RA launches sub container. Local resource allocator also enforces the resource limits on sub containers.

It may be noted from the above scenario that, the query master need not request the RM to allocate resources for an ad-hoc query, and allocations under the purview of the DRS and thus resource isolation and take care of optimized utilization of cluster when idle.

Figure 10:
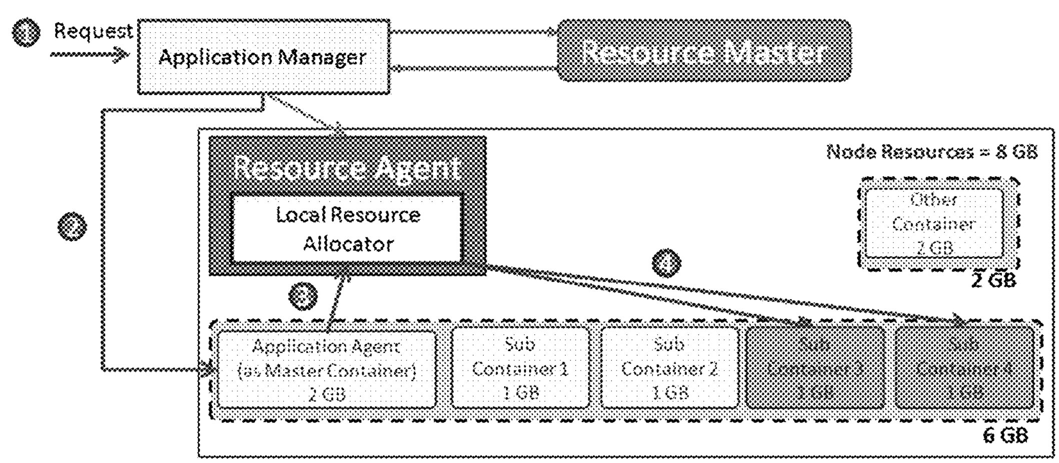
FIG. 10 illustrates an example 2 showing low latency which ensures high performance achieved by the framework for low latency node local scheduling, in accordance with an embodiment of the present disclosure.

Referring now to FIG. 10 an example 2 showing low latency which ensures high performance achieved by the framework for low latency node local scheduling is illustrated in accordance with an embodiment of the present disclosure. The present disclosure ensures high performance for the applications which needs containers to be launched very quickly (low latency) and locally. Without this disclosure, in DRS frameworks, application needs to interact with RM and wait till resources are allocated to the required node.

As shown in FIG. 10, whenever a new request arrives, AM may merely inform already launched application agent (running as Master container) on the node to execute request fragments which need to be executed on that node. Master container may then contact RA on the node to launch sub-containers within its resource limits to execute request fragments. Alternatively, application may keep the sub-containers after request finishes and resize them when the next request arrives. The present disclosure also allows pausing of sub-containers in case a higher priority request comes. As allocations are done locally on the node, there is very low latency to serve the request.

In one example, assume an ad-hoc request processing system where master container has been allocated 6 GB of resources on one of the nodes and application agent is launched as master container while using 2 GB of resources for itself, thereby keeping aside 4 GB of resources for sub-containers. Also 2 sub-containers of 1 GB each (Sub container 1 and Sub container 2) have been launched to process an already ongoing request. When a new request comes, flow will be as shown in FIG. 10.

At step 1, a new request arrives at AM.

At step 2, the AM informs application agent (running as master container) on the node where request fragments have to be executed, that a new request has arrived which requires 2 more sub-containers of size 1 GB each on the node.

At step 3, master container/application agent request local resource allocator (in RA) to launch 2 more sub-containers of 1 GB each.

At step 4, local resource allocator checks the limits of master container which requested launching of these sub-containers and as request can be served, it goes ahead to launch Sub container 3 and Sub container 4.

As can be seen above, when the new request comes, the present disclosure enables to carry out allocations locally within the limits of master container which helps in achieving low latency and thus higher performance.

Figure 11:
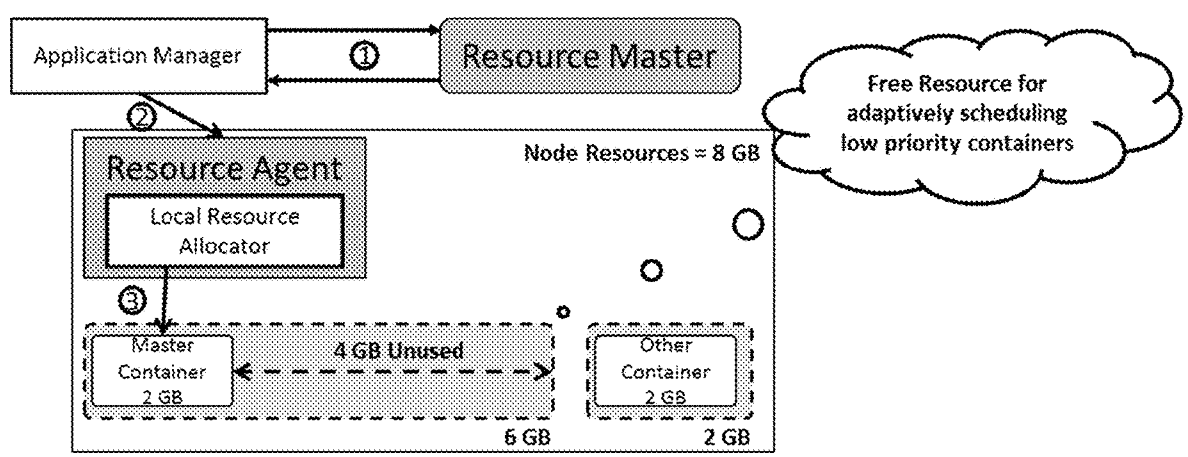
FIG. 11 illustrates an example 3 showing Optimized cluster resource utilization achieved by the framework for low latency node local scheduling, in accordance with an embodiment of the present disclosure.

Referring now to FIG. 11 an example 3 showing optimized cluster resource utilization achieved by the framework for low latency node local scheduling is illustrated in accordance with an embodiment of the present disclosure. According to the present disclosure there is no need to keep pre launched/pre warmed containers. Instead the present disclosure allows reserving the resources for master container in RM, hence during off peak hours, advanced features like adaptive scheduling can kick in and on need basis which can resize the master container size itself. Adaptive scheduling is a feature in DRS framework which allows the framework to over allocate resources when resource usage of containers is less than the allocated resource for containers.

Referring to an example as shown in FIG. 11, the node resource is 8 GB and usage is 4 GB (2 GB Master Container+2 GB for other containers), so remaining 4 GB is available for RM to adaptively over schedule low priority containers which on need basis can be preempted. The present disclosure ensures that all the processes in an ad-hoc request processing system may be launched as containers i.e. within DRS framework, which means that features such as adaptive scheduling, can be utilized.

Figure 12:
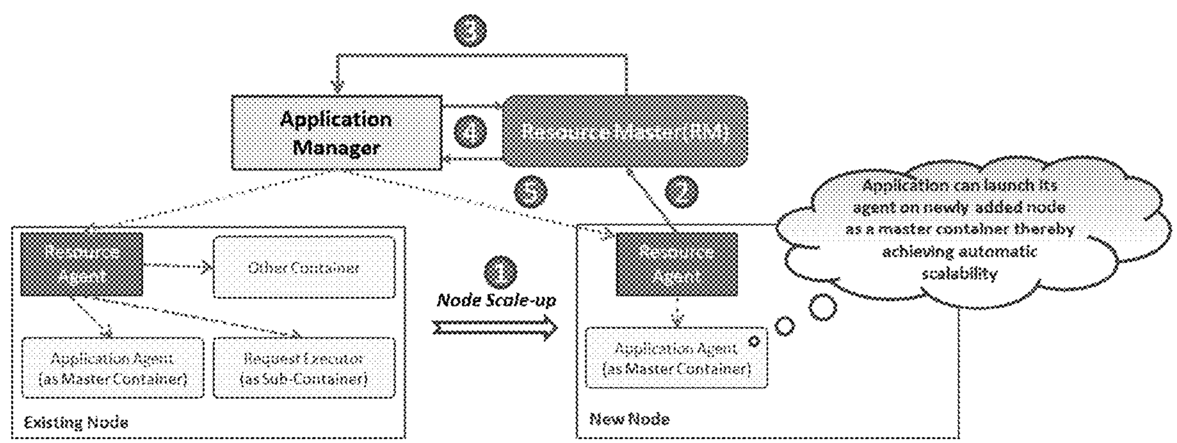
FIG. 12 illustrates an example 4 showing scalability on cloud achieved by the framework for low latency node local scheduling, in accordance with an embodiment of the present disclosure.

Referring now to FIG. 12 an example 4 showing scalability on cloud achieved by the framework for low latency node local scheduling is illustrated in accordance with an embodiment of the present disclosure. According to the present disclosure, the ad-hoc request processing systems can easily launch their application agents' as master containers. This means that when a node is scaled up and subsequently RA is launched, application can also launch application agent on the newly added node as master container, thereby achieving scalability. The typical flow for an ad-hoc request processing system in cloud may be as shown in FIG. 12.

A shown in FIG. 12, assume, existing nodes already have Application agents launched as master containers and request executors are running as sub-containers'. The flow for node scale-up thus, after the present disclosure would work as follows:

At step 1, node is scaled up i.e. a new node is added on cloud. As cloud typically supports auto-scaling of DRS framework, RA will also be automatically started up on the new node.

At step 2, RA running on the new node registers RM.

At step 3, AM is informed of the new node being added.

At step 4, AM can then scale up as well by launching its application agent on the new node as master container. So it asks for resources from RM for the master container plus some buffer resources.

At step 5, upon receipt of resources from RM, AM asks RA to launch application agent as master container.

In one implementation, the present disclosure is better suited for multi-tenant scenarios. If application needs to serve multi-tenant resource requests, then the present disclosure suits better as resource isolation for sub-containers is ensured. This means different sub-containers can process different requests from different tenants without impeding upon processing of other requests. The solution ensures that one heavy request does not hog all the system resources and enforces resource usage within the limits of what has been allocated to it.

Figure 13:
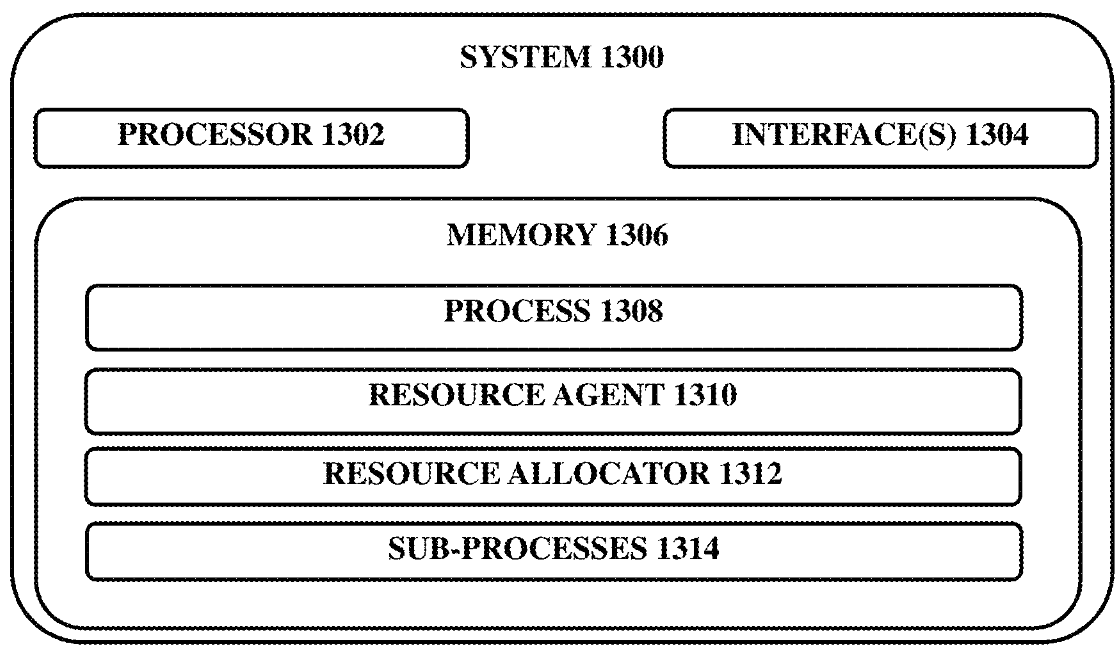
FIG. 13 illustrates a system for allocation of resources, for processing jobs within a distributed system, in accordance with an embodiment of the present disclosure.

FIG. 13 illustrates a system for allocation of resources, for processing jobs within a distributed system, in accordance with an embodiment of the present disclosure.

Although the present disclosure is explained considering that the for allocation of resources, for processing jobs within a distributed system is implemented as a system 1300, it may be understood that the system 1300 may also be implemented in a variety of computing systems, such as a laptop computer, a desktop computer, a notebook, a workstation, a mainframe computer, a server, a network server, and the like. It will be understood that the system 1300 may be accessed by multiple users through one or more user devices. Examples of the system 1300 may include, but are not limited to, a portable computer, a personal digital assistant, a handheld device, and a workstation. The system 1300 is communicatively coupled to other nodes, through a network.

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

In one embodiment, the system 1300 may include at least one processor 1302, an input/output (I/O) interface 1304, and a memory 1306. The at least one processor 1302 may be implemented as one or more microprocessors, microcomputers, microcontrollers, digital signal processors, central processing units, state machines, logic circuitries, and/or any devices that manipulate signals based on operational instructions. Among other capabilities, the at least one processor 1302 is configured to fetch and execute computer-readable instructions stored in the memory 1306.

The I/O interface 1304 may include a variety of software and hardware interfaces, for example, a web interface, a graphical user interface, and the like. The I/O interface 1304 may allow the system 1300 to interact with a user directly or through the client devices (not shown). Further, the I/O interface 1304 may enable the system 1300 to communicate with other computing devices, such as web servers and external data servers (not shown). The I/O interface 1304 can facilitate multiple communications within a wide variety of networks and protocol types, including wired networks, for example, LAN, cable, etc., and wireless networks, such as WLAN, cellular, or satellite. The I/O interface 1304 may include one or more ports for connecting a number of devices to one another or to another server.

The memory 1306 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 1306 may include logics for performing respective functions of the system 1300.

In one first embodiment, a system 1300, for allocation of resources, for processing jobs within a distributed system which receives jobs to be processed is provided. The system 1300 includes a processor 1302 and a memory 1306 coupled to the processor for executing a plurality of modules present in the memory 1306. The memory includes at least one process 1308 and at least one resource allocator 1312. The at least one process 1308 is adapted for processing jobs within a distributed system which receives jobs to be processed. The at least one resource allocator 1312 is communicably coupled with at least one process 1308, and is adapted to generate one or more sub-processes 1314 within a limit of one or more resources allocated to the at least one process 1308 for processing jobs.

In one first detailed implementation of the first embodiment, the system may include one or more buffered process associated with the one or more sub-processes 1314.

In one second detailed implementation of the first embodiment, the at least one resource allocator is adapted to allocate the one or more sub-processes locally, within a scope of the system, to the at least one process.

In one third detailed implementation of the first embodiment, the at least one process 1308 is adapted to resize and/or pause the one or more sub-processes 1314 for processing jobs.

In one fourth detailed implementation of the first embodiment, the at least one process 1308 is adapted to co-ordinate the one or more sub-processes 1314 requests for processing jobs.

In one fifth detailed implementation of the first embodiment, the system further includes at least one RA 1310, residing in the memory 1306, having the at least one resource allocator 1312, which resides in the RA, wherein the at least one RA 1310 is adapted to generate the at least one process 1308 specifying the one or more resources allocated resources required for the at least one process 1308 and the one or more resources set aside to generate one or more sub-processes 1314.

In one sixth detailed implementation of the first embodiment, the at least one resource allocator 1312 is further adapted to track of the one or more resources available for the allocation and thereby generates the at least one process based on the one or more resources available.

In one seventh detailed implementation of the first embodiment, the system 1300 may further include at least one resource manager adapted to transmit jobs to be processed by the at least one process.

In one second embodiment, a system 1300, for allocation of resources, for processing jobs within a distributed system which receives jobs to be processed is provided. The system 1300 includes a processor 1302 and a memory 1306 coupled to the processor 1302 for executing a plurality of modules present in the memory 1306. The memory 1306 includes at least one AM, at least one process 1308, and at least one resource allocator 1312. The at least one AM is adapted to receive the jobs to be processed. The at least one process 1308 adapted for processing jobs by utilizing one or more sub-processes 1314. The at least one resource allocator 1312, communicably coupled with at least one process 1308, adapted to generate the one or more sub-processes 1314 within a limit of one or more resources allocated to the at least one process 1308 for processing jobs. The at least one resource allocator 1312 resides in at least one RA 1310.

Figure 14:
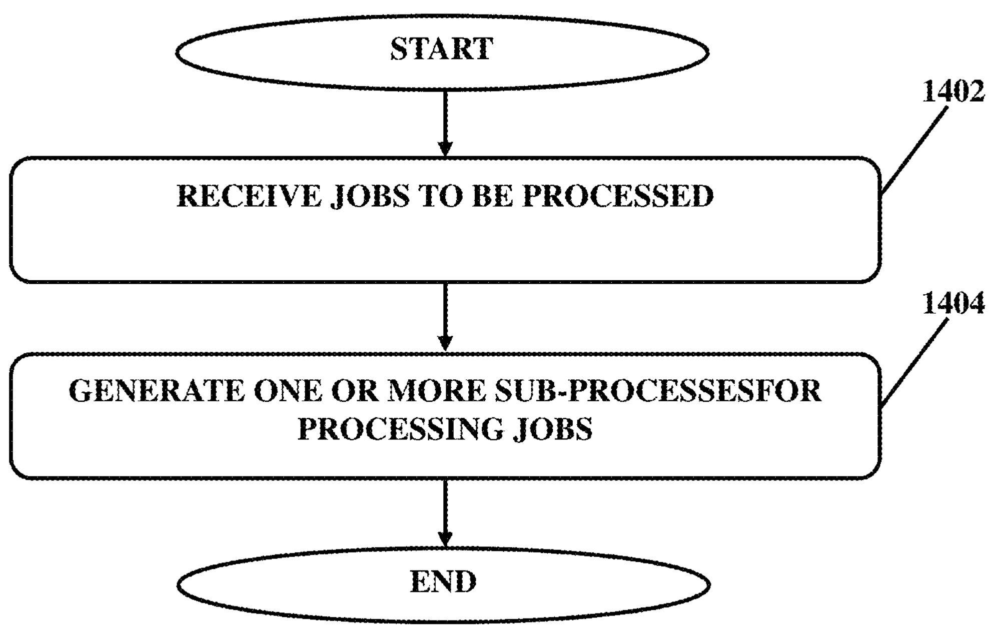
FIG. 14 illustrates a method for allocation of resources, for processing jobs within a distributed system, in accordance with an embodiment of the present disclosure.

Referring to FIG. 14, a method for allocation of resources, for processing jobs within a distributed system which receives user jobs to be processed is illustrated, in accordance with an embodiment of the present disclosure. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described system 1300.

Referring now to FIG. 14.

At step 1402, at least one process 1308 receives the jobs to be processed.

At step 1404, at least one resource allocator 1312 is communicably coupled with the at least one process 1308. The at least one resource allocator 1312 generates one or more sub-processes 1314 within a limit of one or more resources allocated to the at least one process 1308 for processing jobs.

Figure 15:
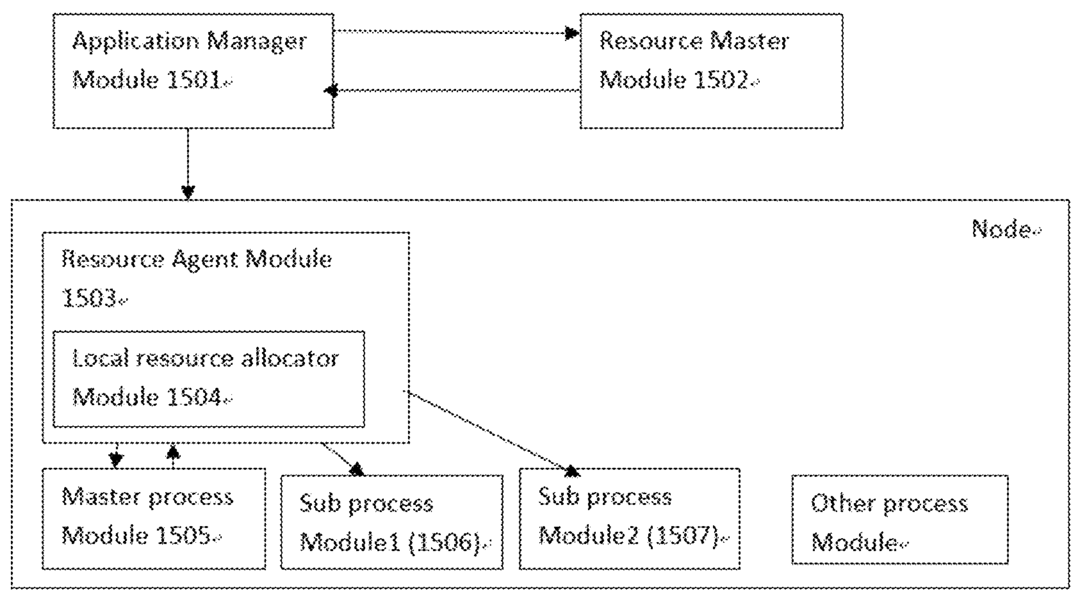
FIG. 15 illustrates a schematic diagram, in accordance with an embodiment of the present disclosure.

Referring to FIG. 15, at 1501, an AM module (1501) operatively communicable to a RM module (1502) for the allocation of resources. The AM module (1501) is operatively communicable or contacted to a RA module (1503) for generating a master process module (1505) (i.e. master container) after the allocation of resources by the RM module (1502). A local resource allocator module (1504), which is operatively located in the RA module (1503). The local resource allocator module (1504) adapted to generate the master process module (1505) and keeps track of the allocated resources. After receiving the job request, the AM module (1501) operatively contacted or communicable to the master process module (1505), then the master process module (1505) operatively contacted or communicable to the local resource allocator module (1504) for generating one or more sub-process modules (1506,1507) thereby the local resource allocator module (1504) is adapted to generate the one or more sub process modules (1506,1507) for processing the job request based on the allocation of resources such that low latency node local allocation of resources is achieved.

A person skilled in the art may understand that any known or new algorithms by be used for the implementation of the present disclosure. However, it is to be noted that, the present disclosure provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present disclosure.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely exemplary. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present disclosure essentially, or the part contributing to other approaches, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present disclosure. The foregoing storage medium includes any medium that can store program code, such as a USB flash drive, a removable hard disk, a read-only memory (ROM), a random access memory (RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Although implementations for system and method for low latency node local scheduling in distributed resource management have been described in language specific to structural features and/or methods, it is to be understood that the appended claims are not necessarily limited to the specific features or methods described. Rather, the specific features and methods are disclosed as examples of implementations of system and method for low latency node local scheduling in distributed resource management.

What is claimed is:

1. A device, comprising:

a processor; and a memory coupled to the processor and storing instructions that, when executed by the processor, cause the processor to be configured to:

communicate with a resource master to allocate node resources on a node of a distributed system;

generate a master container after allocation of the node resources;

allocate container resources for the master container from the node resources, wherein the container resources comprise resources for running the master container and buffer resources, and wherein the buffer resources comprise a total amount of memory for processing job requests in the device;

receive the job requests;

generate sub-containers within the master container, wherein each of the sub-containers comprises a portion of the total amount of memory for processing the job requests in the device;

allocate, by the processor for each of the job requests, one of the sub-containers to process the job request;

reallocate, by the processor for each of the job requests, the one of the sub-containers to another one of the job requests when the portion of the total amount of memory is not being utilized by the job request;

reallocate, by the processor, the portion of the total amount of memory from the one of the sub-containers to a higher priority job request by pausing the one of the sub-containers when the higher priority job request is received by the device; and resize, by the processor, sizes of the master container and the sub-containers based on resource usage of the device.

2. The device of claim 1, wherein the instructions further cause the processor to be configured to track the allocation of the node resources.

3. The device of claim 1, wherein the instructions further cause the processor to be configured to determine whether the allocation of the buffer resources for each of the sub-containers is within a limitation preset by the master container.

4. The device of claim 1, wherein the instructions further cause the processor to be configured to resize the resources for each of the sub-containers.

5. The device of claim 1, wherein the instructions further cause the processor to be configured to pause each of the sub-containers.

6. The device of claim 1, wherein the master container is configured to coordinate with each of the sub-containers.

7. The device of claim 1, wherein the job request comprises an ad-hoc job request.

8. The device of claim 1, wherein a size of each of the sub-containers is within resource limits of the master container.

9. A method implemented by a device, the method comprising:

communicating with a resource master for allocation of node resources;

generating a master container after the allocation of the node resources by the resource master;

allocating container resources for the master container from the node resources, wherein the container resources comprise resources for running the master container and buffer resources, and wherein the buffer resources comprise a total amount of memory for processing job requests in the device;

receiving the job requests;

generating sub-containers within the master container, wherein each of the sub-containers comprises a portion of the total amount of memory for processing the job requests in the device;

allocating, for each of the job requests, one of the sub-containers to the job request to process the job request;

reallocating, for each of the job requests, the one of the sub-containers to another one of the job requests when the portion of the total amount of memory is not being utilized by the job request;

reallocating the portion of the total amount of memory from the one of the sub-containers to a higher priority job request by pausing the one of the sub-containers when the higher priority job request is received by the device; and resizing sizes of the master container and the sub-containers based on resource usage of the device.

10. The method of claim 9, further comprising tracking of the allocation of the node resources.

11. The method of claim 9, further comprising determining whether the allocation of the buffer resources for each of the sub-containers is within a limitation preset by the master container.

12. The method of claim 9, further comprising resizing the resources for each of the sub-containers.

13. The method of claim 9, further comprising pausing each of the sub-containers.

14. The method of claim 9, further comprising coordinating the master container with each of the sub-containers.

15. The method of claim 9, wherein the job request comprises an ad-hoc job request.

16. The method of claim 9, wherein a size of each of the sub-containers is within resource limits of the master container.

17. A computer program product comprising computer-executable instructions stored on a non-transitory computer-readable medium that, when executed by a processor, cause a computing device to:

communicate with a resource master to allocate node resources;

generate a master container after the allocation of the node resources by the resource master;

allocate container resources for the master container from the node resources, wherein the container resources comprise resources for running the master container and buffer resources, and wherein the buffer resources comprise a total amount of memory for processing job requests in the computing device;

receive the job requests;

generate sub-containers within the master container, wherein each of the sub-containers comprises a portion of the total amount of memory for processing the job requests in the computing device;

allocate, for each of the job requests, one of the sub-containers to process the job request;

reallocate, for each of the job requests, the one of the sub-containers to another one of the job requests when the portion of the total amount of memory is not being utilized by the job request;

reallocate the portion of the total amount of memory from the one of the sub-containers to a higher priority job request by pausing the one of the sub-containers when the higher priority job request is received by the computing device;

resize sizes of the master container and the sub-containers based on resource usage of the computing device.

18. The computer program product of claim 17, wherein the instructions further cause the computing device to determine whether the allocation of the buffer resources for each of the sub-containers is within a limitation preset by the master container.

19. The computer program product of claim 17, wherein the instructions further cause the computing device to coordinate the master container with each of the sub-containers.

20. The computer program product of claim 17, wherein a size of each of the sub-containers is within resource limits of the master container.

* * * * *